US011749127B2

(12) United States Patent
Khatwa et al.

(10) Patent No.: US 11,749,127 B2
(45) Date of Patent: Sep. 5, 2023

(54) SYSTEM AND METHOD TO PROVIDE PROGRESSIVE TAXI INSTRUCTIONS AND ALERTS ON COCKPIT DISPLAY

(71) Applicant: HONEYWELL INTERNATIONAL INC., Charlotte, NC (US)

(72) Inventors: Ratan Khatwa, Redmond, WA (US); Mohammed Ibrahim Mohideen, Bangalore (IN); Vineetha Chandran, Bangalore (IN); Dhivagar Palanisamy, Phoenix, AZ (US); Niranjan Kalyandurg, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 324 days.

(21) Appl. No.: 17/070,212

(22) Filed: Oct. 14, 2020

(65) Prior Publication Data

US 2022/0068149 A1 Mar. 3, 2022

(30) Foreign Application Priority Data

Aug. 31, 2020 (IN) .............................. 202011037451

(51) Int. Cl.
*G08G 5/06* (2006.01)
*B64D 43/00* (2006.01)
*G08G 5/00* (2006.01)

(52) U.S. Cl.
CPC ............. *G08G 5/065* (2013.01); *B64D 43/00* (2013.01); *G08G 5/0013* (2013.01); *G08G 5/0043* (2013.01)

(58) Field of Classification Search
None
See application file for complete search history.

(56) References Cited

U.S. PATENT DOCUMENTS

| 6,571,166 B1 | 5/2003 | Johnson et al. |
| 6,920,390 B2 | 7/2005 | Mallet et al. |
| 7,623,044 B2 | 11/2009 | Pepitone et al. |

(Continued)

FOREIGN PATENT DOCUMENTS

| EP | 2624237 A1 | 8/2013 |
| WO | 99/04304 A1 | 1/1999 |

*Primary Examiner* — Aniss Chad
*Assistant Examiner* — Madison R Hughes
(74) *Attorney, Agent, or Firm* — Lorenz & Kopf LLP

(57) ABSTRACT

A flight deck system for providing progressive taxiing guidance is provided. The flight deck system comprises a controller configured to: generate a graphical insert to overlay a small portion of an active navigation display, the graphical insert providing a progressive depiction of upcoming travel surfaces on a cleared taxi route. The graphical insert comprises a non-linear map with non-linear scaling, a current travel surface alphanumeric indicator, and a current travel surface stick character representative of a current travel surface. The controller is further configured to position, on the graphical insert, a crossing travel surface sign, a first-turn travel surface stick character, and a second-turn travel surface stick character; update the position of the crossing travel surface sign, the first-turn travel surface stick character, and/or the second-turn travel surface stick character as the aircraft travels; and cause the graphical insert to be displayed as an overlay on the active navigation display.

20 Claims, 5 Drawing Sheets

(56) References Cited

U.S. PATENT DOCUMENTS

| | | | |
|---|---|---|---|
| 7,737,867 B2 | 6/2010 | Arthur et al. | |
| 7,974,773 B1 | 7/2011 | Krenz et al. | |
| 8,633,835 B1 * | 1/2014 | Spencer, V | G01C 23/00 |
| | | | 342/65 |
| 8,660,783 B2 | 2/2014 | Marczi et al. | |
| 8,694,237 B1 * | 4/2014 | Romine, III | G08G 5/0078 |
| | | | 701/301 |
| 9,443,438 B1 | 9/2016 | Shapiro et al. | |
| 9,472,110 B2 | 10/2016 | Murthy et al. | |
| 9,517,844 B2 | 12/2016 | Khatwa et al. | |
| 9,666,085 B2 | 5/2017 | Gannon et al. | |
| 10,473,484 B1 * | 11/2019 | Goldstein | G08G 5/0052 |
| 2004/0006412 A1 | 1/2004 | Doose et al. | |
| 2005/0190079 A1 | 9/2005 | He | |
| 2007/0241936 A1 | 10/2007 | Arthur et al. | |
| 2011/0029225 A1 * | 2/2011 | Stayton | G08G 5/065 |
| | | | 701/120 |
| 2011/0106343 A1 * | 5/2011 | Burgin | G08G 5/0021 |
| | | | 701/16 |
| 2011/0196598 A1 | 8/2011 | Feyereisen et al. | |
| 2016/0236795 A1 | 8/2016 | Marczi et al. | |
| 2018/0061243 A1 | 3/2018 | Shloosh | |
| 2022/0335845 A1 * | 10/2022 | Lamb | G08G 5/0078 |

* cited by examiner

SYSTEM AND METHOD TO PROVIDE PROGRESSIVE TAXI INSTRUCTIONS AND ALERTS ON COCKPIT DISPLAY

CROSS REFERENCE TO RELATED APPLICATION

This application claims priority to Indian Provisional Patent Application No. 202011037451, filed Aug. 31, 2020, the entire content of which is incorporated by reference herein.

TECHNICAL FIELD

Embodiments of the subject matter described herein relate generally to flight deck systems. More particularly, embodiments of the subject matter relate to a taxi navigation system in an aerial vehicle.

BACKGROUND

Despite many technological advances, aircraft surface operations continue to be a challenging task for pilots and involves a high workload. The traditional approach of pilot communication with controller for verbal taxi route clearance and subsequent execution can be challenging especially at complex airports. The disorientating experience during surface navigation can be made worse by weather conditions (e.g., fog), time of day (night or bright reflections in sunrise/sunset), confusing signage, or temporary restrictions. Loss of position awareness on the airport surface continues to be a major contributor to runway incursions. Formal incident reports convey that pilots are sometimes reluctant to request progressive taxi instructions from ATC (air traffic control). Operators are seeking cost-effective forward and retrofit solutions to mitigate surface movement incidents and losses.

Hence, it is desirable to provide a taxi navigation system in an aerial vehicle to mitigate surface movement incidents. Furthermore, other desirable features and characteristics will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A flight deck system in an aircraft for providing progressive taxiing guidance to a destination at an aerodrome per taxi clearance information is provided. The flight deck system includes a controller configured to: generate a graphical insert to overlay a small portion (e.g., less than a third) of an active navigation display provided on a display device (e.g., heads down display (HDD), heads up display (HUD), electronic flight bag (EFB), tablet computer) in a cockpit of the aircraft, the graphical insert configured to provide a progressive depiction of upcoming travel surfaces (e.g., runways, taxiways, ramp) on a cleared taxi route using stick characters and alphanumeric characters, the graphical insert comprising a non-linear map with non-linear scaling of an area in front of the aircraft, the non-linear map including a first map section that applies a first scaling factor, a second map section that applies a second scaling factor that is smaller than the first scaling factor, a current travel surface alphanumeric indicator, and a current travel surface stick character that is representative of a current travel surface on which the aircraft travels. The controller is further configured to position, on the graphical insert based on an applicable scaling factor, a crossing travel surface sign representing a crossing travel surface that intersects the current travel surface; position, on the graphical insert based on an applicable scaling factor, a first-turn travel surface stick character representing a first-turn travel surface that intersects the current travel surface, wherein the first-turn travel surface is the next travel surface after the current travel surface on the cleared taxi route; position, on the graphical insert based on an applicable scaling factor, a second-turn travel surface stick character representing a second-turn travel surface that intersects the first-turn travel surface, wherein the second-turn travel surface is the next travel surface after the first-turn travel surface on the cleared taxi route; update the position of the crossing travel surface sign, the first-turn travel surface stick character, and/or the second-turn travel surface stick character as the aircraft travels on travel surfaces; and cause the graphical insert to be displayed as an overlay over the small portion of the active navigation display provided on the display device while the aircraft travels on travel surfaces.

A method in a flight deck system in an aircraft for providing progressive taxiing guidance to a destination at an aerodrome per taxi clearance information is provided. The method includes: generating a graphical insert to overlay a small portion (e.g., less than a third) of an active navigation display provided on a display device (e.g., heads down display (HDD), heads up display (HUD), electronic flight bag (EFB), tablet computer) in a cockpit of the aircraft, the graphical insert configured to provide a progressive depiction of upcoming travel surfaces (e.g., runways, taxiways, ramp) on a cleared taxi route using stick characters and alphanumeric characters, the graphical insert comprising a non-linear map with non-linear scaling of an area in front of the aircraft, the non-linear map including a first map section that applies a first scaling factor, a second map section that applies a second scaling factor that is smaller than the first scaling factor, a current travel surface alphanumeric indicator, and a current travel surface stick character that is representative of a current travel surface on which the aircraft travels. The method further includes positioning, on the graphical insert based on an applicable scaling factor, a crossing travel surface sign representing a crossing travel surface that intersects the current travel surface; positioning, on the graphical insert based on an applicable scaling factor, a first-turn travel surface stick character representing a first-turn travel surface that intersects the current travel surface, wherein the first-turn travel surface is the next travel surface after the current travel surface on the cleared taxi route; positioning, on the graphical insert based on an applicable scaling factor, a second-turn travel surface stick character representing a second-turn travel surface that intersects the first-turn travel surface, wherein the second-turn travel surface is the next travel surface after the first-turn travel surface on the cleared taxi route; updating the position of the crossing travel surface sign, the first-turn travel surface stick character, and/or the second-turn travel surface stick character as the aircraft travels on travel surfaces; and causing the graphical insert to be displayed as an overlay over the small portion of the active navigation display provided on the display device while the aircraft travels on travel surfaces.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
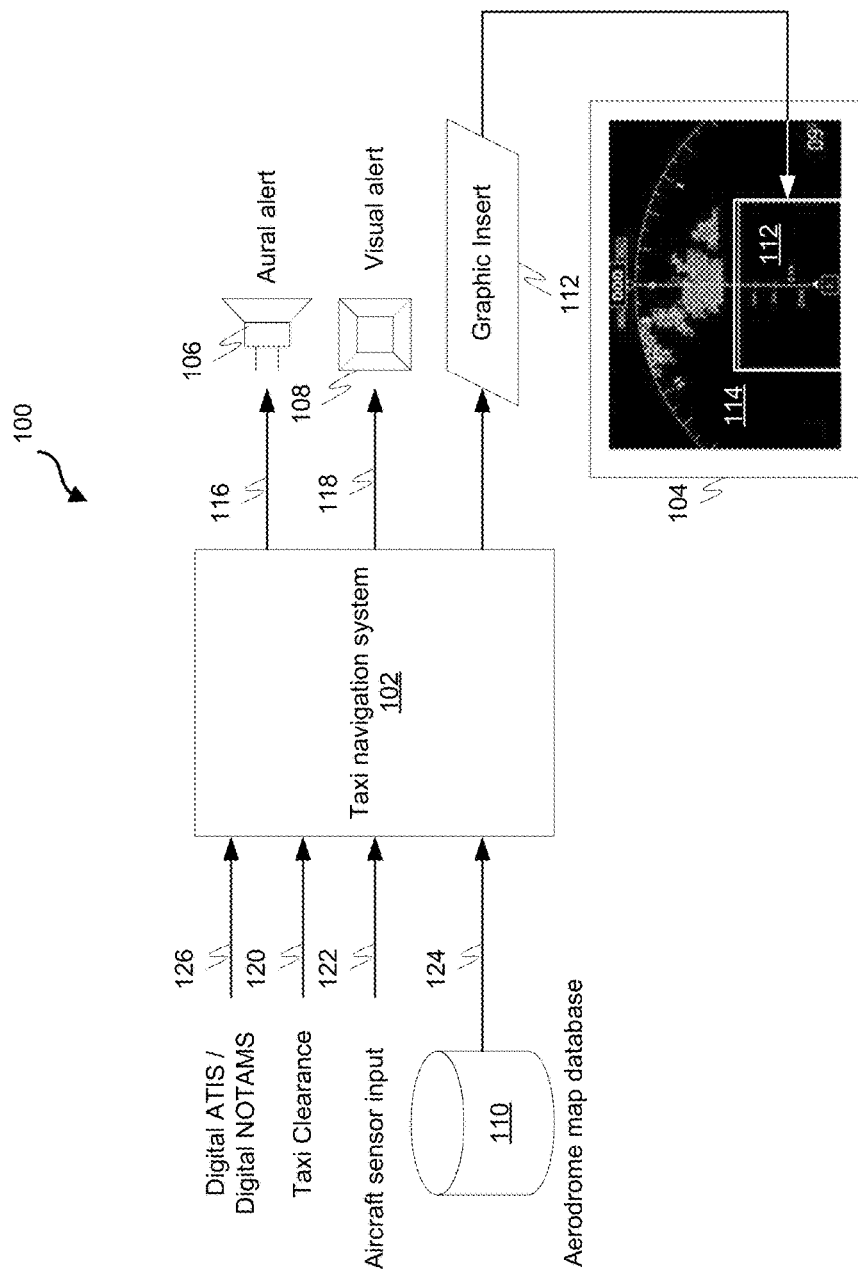
FIG. 1 is a block diagram depicting a high-level system architecture for an example taxi navigation system in an aerial vehicle, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, and articles for providing progressive taxi instruction to flight crew by correlating taxi clearance message and airport layout information present in an Aerodrome Mapping Database (AMDB). An existing TAWS/EGPWS unit may be leveraged for hosting the database and the software that generates progressive taxi instructions. The apparatus, systems, techniques, and articles provided herein can rely on using the existing hardware on fielded aircraft without major modifications thereby addressing a large number of in-service aircraft.

The apparatus, systems, techniques and articles provided herein can: allow for voice and visual assisted progressive navigation cues for taxiing per taxi clearance instructions; utilize the EGPWS terrain raster to create a visual display of taxiway related information (graphical and textual); provide a simplified visual method of depicting upcoming taxiways; provide a picture-in-picture insertion of a simplified depiction of taxiways on a display that uses a non-linear scale compared to the rest of the display in order to provide a means to zoom in at the appropriate scale (e.g., most fielded Nav Displays will not zoom down to scales of a 1000 ft); provide aural and visual caution alerts when the aircraft deviates from the cleared taxi route; provide aural and visual caution (or warning) level alerts when the aircraft taxis onto a surface where it exceeds limits such as weight, wingspan and closed surfaces; and/or provide advisory level visual alerts when approaching runway incursion hotspots or other locations of interest such as parking stands and/or when the aircraft taxi speed has not been sufficiently reduced in anticipation of an upcoming turn.

During a taxi phase, the flight crew may be interested in having awareness of the current taxiway and runway identifier and the upcoming turns/intersections as per the issued taxi clearance. The latter includes, the distance from current location to upcoming turn so as to prepare (e.g., speed reduction) for the turn at the right time, the direction of turn (left/right) and the required change in heading to complete the turn. The apparatus, systems, techniques, and articles provided herein can extract taxi instructions by processing the taxi clearance and airport database in reference to aircraft current location. The combination of graphical and aural instruction can help the flight crew to adhere to the issued clearance. To handle an abnormal scenario, the apparatus, systems, techniques, and articles provided herein can alert the flight crew when the aircraft deviates from an expected route or enters surfaces where limitations such as wingspan or weight are exceeded. The apparatus, systems, techniques and articles provided herein may also be pre-configured to generate aural and/or visual annunciation upon the aircraft reaching specific locations of interest (e.g., low visibility points for position reporting, hold short line before crossing runways, intersections, hotspots, etc.)

FIG. 1 is a block diagram depicting a high-level system architecture 100 for an example taxi navigation system 102 in an aerial vehicle (e.g., aircraft). The example system architecture 100 includes the example taxi navigation system 102, a cockpit display device 104 (e.g., heads down display (HDD), heads up display (HUD), electronic flight bag (EFB), tablet computer, etc.), an aural alert device 106 (e.g., a speaker or PA system), a visual alert device 108 (e.g., warning light or button), and an aerodrome map database (AMDB) 110. The example taxi navigation system 102 is configured to provide flight crew in the aerial vehicle with progressive taxiing guidance to a destination at an aerodrome per taxi clearance information during ground operations for the aerial vehicle.

The example taxi navigation system 102 includes a controller that is configured to implement taxi navigation software to provide flight crew in the aerial vehicle with progressive taxiing guidance to a destination at an aerodrome per taxi clearance information during ground operations for the aerial vehicle. The controller includes at least one processor and a computer-readable storage device or media encoded with programming instructions (e.g., the taxi navigation software) for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example taxi navigation system 102 may be incorporated in an existing flight deck system in the aircraft (e.g., an EGPWS system, an EFB, a tablet computer, or other systems). Alternatively, the example taxi navigation system 102 may exist in dedicated hardware on the aircraft. The example taxi navigation system 102, via the controller, is configured to generate a graphical insert 112 to overlay a small portion (e.g., less than a third) of an active navigation display 114 provided on the display device 104 in a cockpit of the aircraft. The graphical insert 112 is configured to provide a progressive depiction of upcoming travel surfaces (e.g., runways, taxiways, ramp) on a cleared taxi route using stick characters and alphanumeric characters.

The example taxi navigation system 102 is also configured to provide an aural alert 116 (e.g., advisory, caution, or warning) via the aural alert device 106 and a visual alert 118 (e.g., advisory, caution, or warning) via the visual alert device 108 and/or display device 104. The example taxi navigation system 102 is also configured to provide an aural alert 116 and/or visual alert 118 when the aircraft deviates from a cleared taxi route. The example taxi navigation system 102 is configured to provide an aural alert 116 and/or visual alert 118 when the aircraft travels onto a surface where the aircraft exceeds a surface limit. The example taxi navigation system 102 is configured to provide an aural alert 116 and/or visual alert 118 when the aircraft approaches a location of interest (such as a runway incursion hotspot, a parking stand, or a position reporting location). The example taxi navigation system 102 is configured to provide a predictive alert (e.g., an aural alert 116 and/or visual alert 118) of a potential alert condition (e.g., missed turn) that may occur based on aircraft travel characteristics (e.g., aircraft speed) derived from aircraft sensor inputs to allow a flight crew member to take appropriate action to avoid a potential alert condition. The example taxi navigation system 102 is configured to provide a predictive alert (e.g., an aural alert 116 and/or visual alert 118) of a potential missed turn when the aircraft is determined to not be decelerating ahead of an upcoming turn as per the taxi clearance information to allow a flight crew member to take appropriate action before missing a turn.

The example taxi navigation system 102 is configured to receive the taxi clearance information 120 from air traffic control (via voice, digital, or manual entry), aircraft sensor inputs 122 (e.g., via GPS, IMU data) identifying a location of the aircraft on a travel surface, aerodrome mapping data 124 from the AMD 110, and digital ATIS (D-ATIS) and/or digital NOTAMS 126 containing the latest conditions at the aerodrome such as temporarily closed runways or taxiways. The taxi clearance information could take a form of (a) clearance sent over datalink (CPDLC) or broadband and received in an avionics communication unit; (b) clearance entered by a pilot on an MCDU unit based on flight crew's radio communication with ATC; or (c) clearance text obtained by converting voice using any suitable speech transcription software. The example taxi navigation system 102 is further configured to determine from the taxi clearance information 120 and the aerodrome mapping data 124 a cleared taxi route for the aircraft to follow to reach a cleared aerodrome destination. The example taxi navigation system 102 is further configured to identify the cleared travel surfaces on the cleared taxi route. The example taxi navigation system 102 is configured to provide the progressive taxiing instructions using the cleared travel surfaces.

The example taxi navigation system 102 is configured to determine, using the aircraft sensor inputs, the taxi clearance information, and the aerodrome mapping data, when the aircraft deviates from the cleared taxi route; and provide an aural and/or visual alert (e.g., advisory, caution, or warning) when the aircraft deviates from the cleared taxi route.

The example taxi navigation system 102 is configured to determine, using the aircraft sensor inputs, the taxi clearance information, and the aerodrome mapping data, when the aircraft travels onto a surface where the aircraft exceeds a surface limit (e.g., one or more of weight, wingspan and the surface is closed to traffic (e.g., from the aerodrome map database, D-ATIS or NOTAMS)); and provide the aural and/or visual alert when the aircraft travels onto the surface where the aircraft exceeds the surface limit.

The example taxi navigation system 102 is configured to determine, using the aircraft sensor inputs and the aerodrome mapping data, when the aircraft approaches a location of interest (such as a runway incursion hotspot, a parking stand, or a position reporting location); and provide the visual and/or aural alert when the aircraft approaches the location of interest (e.g., provide a pilot with a distance to the position reporting location while approaching).

Figure 2:
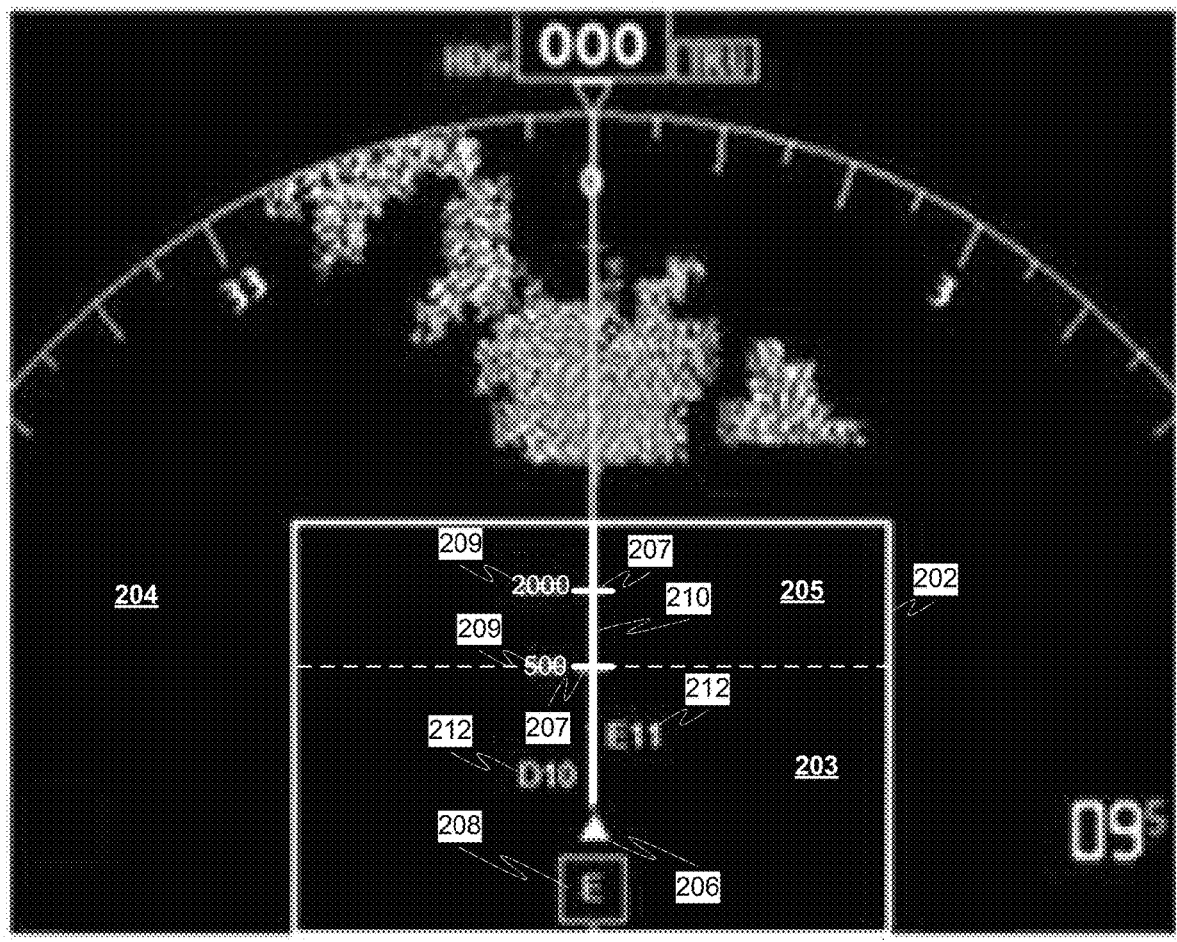
FIG. 2 is a diagram depicting a graphical insert for a navigation display provided as a picture-in-picture insert by the example taxi navigation system when the example taxi navigation system operates in an awareness mode, in accordance with some embodiments.
Figure 3:
FIG. 3 is a diagram depicting a graphical insert for a navigation display provided as a picture-in-picture insert by the example taxi navigation system when the example taxi navigation system operates in a navigation mode, in accordance with some embodiments.
Figure 4:
FIG. 4 is a diagram depicting a graphical insert for a navigation display provided as a picture-in-picture insert by the example taxi navigation system when the example taxi navigation system operates in an alerting mode, in accordance with some embodiments.

The example taxi navigation system 102 has at least three modes of operation, namely an awareness mode, a navigation mode, and an alerting mode. FIGS. 2-4 are diagrams depicting example navigation displays, each with a graphical insert for one of the three operating modes provided as a picture-in-picture insert by the example taxi navigation system 102. A runway incursion hotspot may include areas not visible from a control tower and complex geometries at the intersection of surfaces such as crossing runways and taxiways, taxiway/taxiway intersections, taxiway intersection with runway in close proximity to another runway, and others.

FIG. 2 is a diagram depicting a graphical insert 202 for a navigation display 204 provided as a picture-in-picture insert by the example taxi navigation system 102 when the example taxi navigation system 102 operates in an awareness mode. The example taxi navigation system 102 is configured to cause the graphical insert 202 to be displayed as an overlay over a small portion (e.g., less than a third) of the active navigation display 204 provided on the display device while the aircraft travels on travel surfaces. The awareness mode is aimed at helping flight crew avoid spatial disorientation while taxiing. At any instant of time, provided graphical and/or aural instruction can help flight crew to know "where I am right now" and "what is ahead of me". The current taxiway 208 is depicted in a black square symbol consistent with real-world taxiway signage. This could aid flight crew in navigating against the clearance that was noted based on radio communication with ATC. As an alternate scheme of assisting flight crew, the current runway/taxiway identifier can be annunciated, for example, by press of a button in the flight deck.

The graphical insert 202 comprises a non-linear map with non-linear scaling of an area in front of the aircraft represented by an aircraft symbol 206. The non-linear map includes a first map section 203 that applies a first scaling factor, a second map section 205 that applies a second scaling factor that is smaller than the first scaling factor, a current travel surface alphanumeric indicator 208, and a current travel surface stick character 210 that is representative of a current travel surface on which the aircraft travels. The current travel surface stick character 210 include tick marks 207 and numeric indicators 209 indicative of a distance in front of the aircraft in both the first map section 203 and the second map section 205. The graphical insert 202 further provides one or more travel surface signs 212 adjacent to the current travel surface stick character 210 for identifying potential upcoming turns (e.g., two travel surface signs for the next two potential upcoming turns wherein the placement (left or right) of a travel surface sign 212 relative to travel surface stick character 210 indicates the direction (left or right) of the taxiway/runway physical location relative to the travel surface), wherein each travel surface sign 212 identifies an upcoming travel surface onto which the aircraft may exit the current travel surface 210. The graphical insert 202 is scaled differently to the rest of the navigation display 204 to allow depiction at current range selections on the navigation display 204. This mode may rely on a weight-on-wheels input to indicate ground operations and be provided at groundspeeds below 40 kts to prevent depiction during the take-off roll.

Also, depicted in FIG. 2 is an illustration of an aural alert that may be provided by the example taxi navigation system 102 when in the awareness mode. In this example, the example taxi navigation system 102 provides an aural alert 214 indicating that the aircraft is on the "Echo" travel surface.

The example taxi navigation system 102 is configured to position, on the graphical insert based on an applicable scaling factor, the crossing travel surface signs 212 representing crossing travel surfaces that intersects the current travel surface. The example taxi navigation system 102 is configured to update the position of the crossing travel surface signs 212 as the aircraft travels on travel surfaces. To position the crossing travel surface signs 212, the example taxi navigation system 102 is configured to position, on the graphical insert 202, the crossing travel surface signs 212 to intersect the current travel surface stick character 210 at the position based on the tick marks and the applicable scaling factor that is proportional to an actual distance of the crossing travel surface to the front of the aircraft, when the crossing travel surface is within the area covered by the non-linear map.

FIG. 3 is a diagram depicting a graphical insert 302 for a navigation display 304 provided as a picture-in-picture insert by the example taxi navigation system 102 when the example taxi navigation system 102 operates in a navigation mode. In the navigation mode, the example taxi navigation system 102 correlates taxi clearance (e.g., received CPDLC messages or clearance messages manual keyed in by flight crew using an input device such as the MCDU) and airport layout information to generate progressive taxi instruction. The example taxi navigation system 102 determines if the taxi clearance data received from ATC is valid and if valid, determines the aircraft current position with respect to the aerodrome map database. The example taxi navigation system 102 also determines the next step to be performed to get to the desired location on the airport surface. The determined next step may be annunciated aurally and is also sent to the display unit, in a graphical insert 302, for example, as a "matchstick representation" using ASCII protocol on a terrain display.

The example taxi navigation system 102 is configured to cause the graphical insert 302 to be displayed as an overlay over a small portion (e.g., a third or less) of the active navigation display 304 provided on the display device while the aircraft travels on travel surfaces. The graphical insert 302 comprises a non-linear map with non-linear scaling of an area in front of the aircraft represented by an aircraft symbol 306. The non-linear map includes a first map section 303 that applies a first scaling factor, a second map section 305 that applies a second scaling factor that is smaller than the first scaling factor, a current travel surface alphanumeric indicator 308, and a current travel surface stick character 310 that is representative of a current travel surface on which the aircraft travels. The current travel surface stick character 310 including tick marks 307 and numeric indicators 309 indicative of a distance in front of the aircraft in both the first map section 303 and the second map section 305. The graphical insert 302 further provides travel surface stick characters 312, 313 for identifying a plurality of turns (e.g., the next two turns) in the cleared taxi route, and the destination 315 for the cleared taxi route.

Also, depicted is an illustration of an aural alert that may be provided by the example taxi navigation system 102 when in the navigation mode. In this example, the example taxi navigation system 102 provides an aural alert 314 indicating that the aircraft is on the "Echo" travel surface and indicating the next turn for the aircraft of the cleared traffic route.

When in the navigation mode, the example taxi navigation system 102, is further configured to provide a predictive alert (e.g., an aural and/or visual alert) of a potential alert condition (e.g., missed turn) that may occur based on aircraft travel characteristics (e.g., aircraft speed) derived from aircraft sensor inputs to allow a flight crew member to take appropriate action to avoid the potential alert condition. When in the navigation mode, the example taxi navigation system 102, is also configured to provide a predictive alert (e.g., an aural and/or visual alert) of a potential missed turn when the aircraft is determined to not be decelerating ahead of an upcoming turn as per the taxi clearance information to allow a flight crew member to take appropriate action before missing the turn.

The example taxi navigation system 102 is configured to position, on the graphical insert 302 based on an applicable scaling factor, the first-turn travel surface stick character 312 representing a first-turn travel surface that intersects the current travel surface, wherein the first-turn travel surface is the next travel surface after the current travel surface on the cleared taxi route. The example taxi navigation system 102 is configured to position, on the graphical insert 302 based on an applicable scaling factor, a second-turn travel surface stick character 313 representing a second-turn travel surface that intersects the first-turn travel surface, wherein the second-turn travel surface is the next travel surface after the first-turn travel surface on the cleared taxi route. The example taxi navigation system 102 is configured to update the position of the first-turn travel surface stick character 312, and the second-turn travel surface stick character 313 as the aircraft travels on travel surfaces.

To position the first-turn travel surface stick character 312, the example taxi navigation system 102 is configured to position, on the graphical insert 302, the first-turn travel surface stick character 312 to intersect the current travel surface stick character 310 at the position based on the tick marks and the applicable scaling factor that is proportional to an actual distance of the first-turn travel surface to the front of the aircraft, when the first-turn travel surface is within the area covered by the non-linear map. To position the second-turn travel surface stick character 313, the example taxi navigation system 102 is configured to position, on the graphical insert, the second-turn travel surface stick character 313 to intersect the first-turn travel surface stick character 312 at the position based on the applicable scaling factor that is proportional to an actual distance of an intersecting point between the second-turn travel surface and the first-turn travel surface, when the second-turn travel surface is within the area covered by the non-linear map. Any hold short line that is present between aircraft current location and next intersection or between first intersection and second intersection can also be depicted.

FIG. 4 is a diagram depicting a graphical insert 402 for a navigation display 404 provided as a picture-in-picture insert by the example taxi navigation system 102 when the example taxi navigation system 102 operates in an alerting mode. The example taxi navigation system 102 is configured to cause the graphical insert 402 to be displayed as an overlay over a small portion (e.g., a third or less) of the active navigation display 404 provided on the display device while the aircraft travels on travel surfaces.

The graphical insert 402 comprises a non-linear map with non-linear scaling of an area in front of the aircraft represented by an aircraft symbol 406. The non-linear map includes a first map section 403 that applies a first scaling factor, a second map section 405 that applies a second scaling factor that is smaller than the first scaling factor, a current travel surface alphanumeric indicator 408, a current travel surface stick character 410 that is representative of a current travel surface on which the aircraft travels, and the aerodrome destination 313 for the cleared taxi route. The current travel surface stick character 410 including tick marks 407 and numeric indicators 409 indicative of a distance in front of the aircraft in both the first map section 403 and the second map section 405.

To provide a predictive alert, the example taxi navigation system 102 also monitors the speed of the aircraft and alerts if there is a probability of missing an upcoming turn. This will aid in the flight crew correcting the path in a timely manner rather than getting too far to correct the path. The example taxi navigation system 102 also generates aural and visual alerts when the pilot deviates from cleared route, violates weight and wingspan limitations, or enters a closed surface (taxiway or runway).

Figure 5:
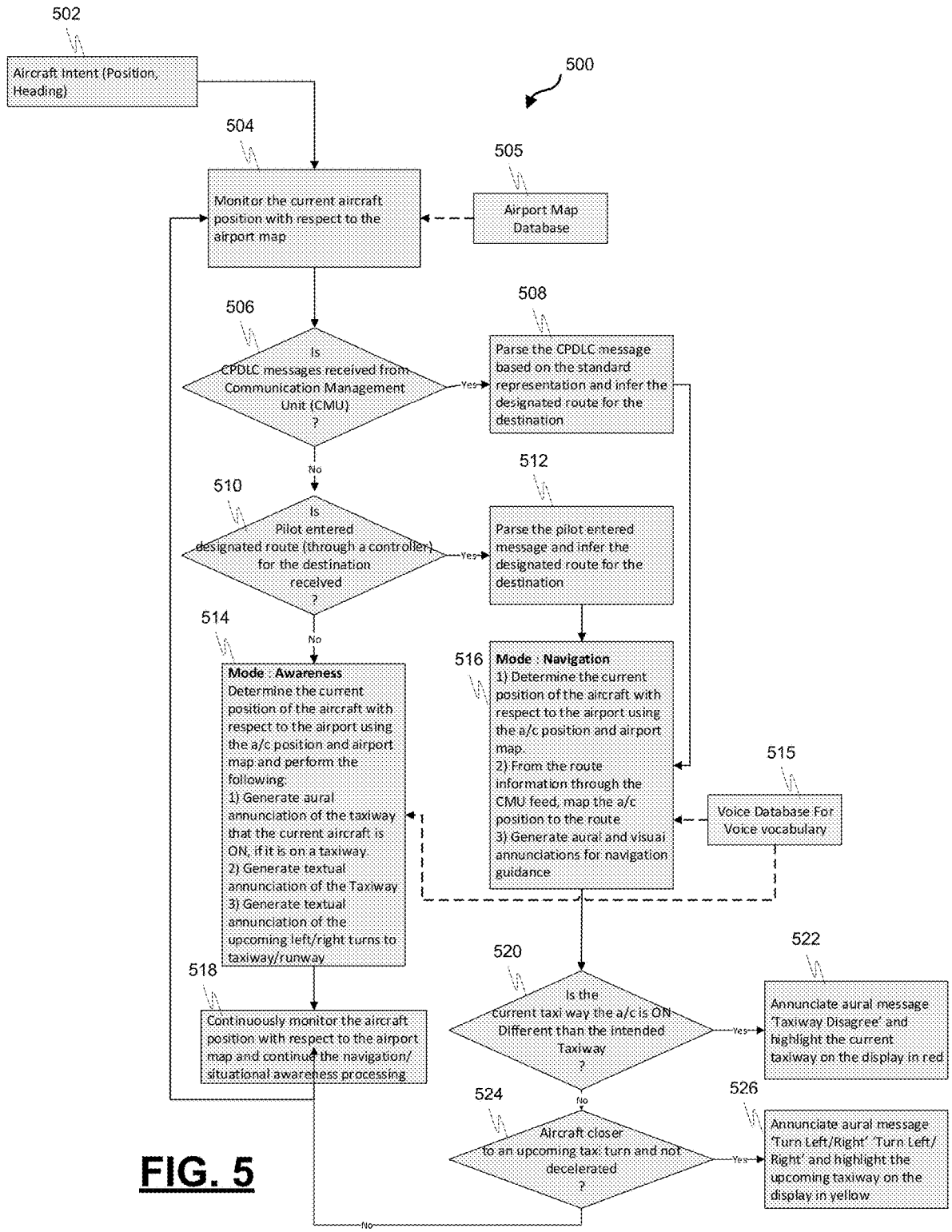
FIG. 5 is a process flow chart depicting an example process in an example taxi navigation system for providing progressive taxiing guidance, in accordance with some embodiments.

Also, depicted is an illustration of an aural alert that may be provided by the example taxi navigation system 102 when in the alerting mode. In this example, the example taxi navigation system 102 provides an aural alert 414 indicating that the aircraft is on the "Wrong Taxiway". The current travel surface alphanumeric indicator 408 may be visually displayed in a manner to indicate that the aircraft is traveling on the wrong travel surface (e.g., displayed in a different color, such as red, to indicate travel surface disagreement). To further gain flight crew attention, the graphical insert 402 may cease to display travel surface stick characters for upcoming turns. Additionally, a visual indication 411, such as CHK CLR (for check clearance), may also be presented FIG. 5 is a process flow chart depicting an example process 500 in an example taxi navigation system 102 for providing progressive taxiing guidance. The order of operation within the process 500 is not limited to the sequential execution as illustrated in the figure, but may be performed in one or more varying orders as applicable and in accordance with the present disclosure.

The example process 500 includes determining the aircraft intent (e.g., position, heading) (operation 502) and monitoring the current aircraft position with respect to the airport map (operation 504), which can be retrieved from an airport map database 505.

The example process 500 includes determining whether a CPDLC message (or other source such as broadband) has been received from a communication management unit (CMU) (decision 506), and if yes at operation 506, parsing the CPDLC message based on the standard representation and inferring the designated route for the destination (operation 508).

If no at operation 506, the example process 500 includes determining if the pilot entered a designated route (e.g., through a controller) for the destination received (decision 510). If yes at decision 510, the example process 500 includes parsing the pilot entered message and inferring the designated route for the destination (operation 512).

After inferring the designated route for the destination (operations 508 or 512), the example taxi navigation system is in a navigation mode and the example process 500 includes determining the current position of the aircraft with respect to the airport using the aircraft position and airport map; and from the route information through the CMU feed, mapping the aircraft position to the route; and generating aural and visual annunciations for navigation guidance (operation 516). A voice database 515 may be accessed for voice vocabulary.

If no at decision 510, the example taxi navigation system is in an awareness mode and the example process 500 includes determining the current position of the aircraft with respect to the airport using the aircraft position and the airport map and performing the following: generating aural annunciation of the taxiway that the current aircraft is ON, if it is on a taxiway; generating a textual annunciation of the taxiway; and generating textual annunciation of the upcoming left/right turns to taxiway/runway (operation 514). The voice database 515 may be accessed for voice vocabulary. The example process 500 includes continuously monitoring the aircraft position with respect to the airport map and continuing navigation/situational awareness processing (operation 518) and monitoring the current aircraft position with respect to the airport map (operation 504).

In the navigation mode, the example process 500 includes determining if the current taxiway the aircraft is ON is different than the intended taxiway (decision 520). If yes at decision 520, the example process 500 includes annunciating an aural message such as 'Taxiway Disagree' and highlighting the current taxiway on the display in red (operation 522). If no at decision 520, the example process 500 includes determining if the aircraft is close to an upcoming taxi turn and not decelerating adequately (decision 524). If yes at decision 524, then the example process 500 includes annunciating an aural message 'Turn Left/Right' 'Turn Left/Right' and highlight the upcoming taxiway on the display in yellow (operation 526). If no at decision 524, then the example process 500 includes continuously monitoring the aircraft position with respect to the airport map and continuing navigation/situational awareness processing (operation 518) and monitoring the current aircraft position with respect to the airport map (operation 504).

Described herein are apparatus, systems, techniques, and articles for providing progressive taxi instruction to the crew by correlating taxi clearance message and airport layout information present in an Aerodrome Mapping Database (AMDB).

In one embodiment, a flight deck system in an aircraft for providing progressive taxiing guidance to a destination at an aerodrome per taxi clearance information is provided. The flight deck system comprises a controller configured to: generate a graphical insert to overlay a small portion (e.g., less than a third) of an active navigation display provided on a display device (e.g., heads down display (HDD), heads up display (HUD), electronic flight bag (EFB), tablet computer) in a cockpit of the aircraft, the graphical insert configured to provide a progressive depiction of upcoming travel surfaces (e.g., runways, taxiways, ramp) on a cleared taxi route using stick characters and alphanumeric characters, the graphical insert comprising a non-linear map with non-linear scaling of an area in front of the aircraft, the non-linear map including a first map section that applies a first scaling factor, a second map section that applies a second scaling factor that is smaller than the first scaling factor, a current travel surface alphanumeric indicator, and a current travel surface stick character that is representative of a current travel surface on which the aircraft travels. The controller is further configured to position, on the graphical insert based on an applicable scaling factor, a crossing travel surface sign representing a crossing travel surface that intersects the current travel surface; position, on the graphical insert based on an applicable scaling factor, a first-turn travel surface stick character representing a first-turn travel surface that intersects the current travel surface, wherein the first-turn travel surface is the next travel surface after the current travel surface on the cleared taxi route; position, on the graphical insert based on an applicable scaling factor, a second-turn travel surface stick character representing a second-turn travel surface that intersects the first-turn travel surface, wherein the second-turn travel surface is the next travel surface after the first-turn travel surface on the cleared taxi route; update the position of the crossing travel surface sign, the first-turn travel surface stick character, and/or the second-turn travel surface stick character as the aircraft travels on travel surfaces; and cause the graphical insert to be displayed as an overlay over the small portion of the active navigation display provided on the display device while the aircraft travels on travel surfaces.

These aspects and other embodiments may include one or more of the following features. The controller may be further configured to: receive the taxi clearance information from air traffic control (e.g., via voice, digital, or manual entry), aircraft sensor inputs identifying a location of the aircraft on a travel surface, and aerodrome mapping data; determine from the taxi clearance information and the aerodrome mapping data the cleared taxi route; travel surface current status (e.g., closed runway, closed taxiway) from sources such as the aerodrome mapping data, Digital ATIS or Digital NOTAMS; and identify a plurality of cleared travel surfaces on the cleared taxi route including the first-turn travel surface and the second-turn travel surface.

The controller may be further configured to: determine, using the aircraft sensor inputs, the taxi clearance information, and the aerodrome mapping data, when the aircraft deviates from the cleared taxi route; and provide an aural and/or visual alert (e.g., advisory, caution, or warning) when the aircraft deviates from the cleared taxi route.

The controller may be further configured to: determine, using the aircraft sensor inputs, the taxi clearance information, and the aerodrome mapping data, when the aircraft travels onto a surface where the aircraft exceeds a surface limit (e.g., one or more of weight, wingspan and the surface is closed to traffic); and provide the aural and/or visual alert when the aircraft travels onto the surface where the aircraft exceeds the surface limit.

The controller may be further configured to: determine, using the aircraft sensor inputs and the aerodrome mapping data, when the aircraft approaches a location of interest (such as a runway incursion hotspot, a parking stand, or a position reporting location); and provide the visual alert when the aircraft approaches the location of interest.

To position the crossing travel surface sign, the controller may be configured to position, on the graphical insert, the crossing travel surface sign to intersect the current travel surface stick character at the position based on the applicable scaling factor that is proportional to an actual distance of the crossing travel surface to the front of the aircraft, when the crossing travel surface is within the area covered by the non-linear map.

To position the first-turn travel surface stick character, the controller may be configured to position, on the graphical insert, the first-turn travel surface stick character to intersect the current travel surface stick character at the position based on the applicable scaling factor that is proportional to an actual distance of the first-turn travel surface to the front of the aircraft, when the first-turn travel surface is within the area covered by the non-linear map.

To position the second-turn travel surface stick character, the controller may be configured to position, on the graphical insert, the second-turn travel surface stick character to intersect the first-turn travel surface stick character at the position based on the applicable scaling factor that is proportional to an actual distance of an intersecting point between the second-turn travel surface and the first-turn travel surface, when the second-turn travel surface is within the area covered by the non-linear map.

The graphical insert may comprise a plurality of display modes wherein in a first mode (an awareness mode), the graphical insert provides a current travel surface indicator and one or more travel surface signs adjacent to the current travel surface stick character for identifying upcoming turns (e.g., two travel surface signs for the next two upcoming turns), wherein each travel surface sign identifies an upcoming travel surface onto which the aircraft may exit the current travel surface.

In a second mode (e.g., a navigation mode), the graphical insert may provide the current travel surface alphanumeric indicator, travel surface stick characters for identifying a plurality of turns (e.g., the next two turns) in the cleared taxi route, and the destination for the cleared taxi route.

In the second mode (e.g., the navigation mode), the controller may provide a predictive alert (e.g., an aural and/or visual alert) of a potential alert condition (e.g., missed turn) that may occur based on aircraft travel characteristics (e.g., aircraft speed) derived from aircraft sensor inputs to allow a flight crew member to take appropriate action to avoid the potential alert condition.

In the second mode (e.g., the navigation mode), the controller may provide a predictive alert (e.g., an aural and/or visual alert) of a potential missed turn when the aircraft is determined to not be decelerating ahead of an upcoming turn as per the taxi clearance information to allow a flight crew member to take appropriate action before missing a turn.

In a third mode (e.g., an alerting mode), the graphical insert visually may display the current travel surface alphanumeric indicator in a manner to indicate travel surface disagreement and, to gain flight crew attention, ceases to display the travel surface stick characters for upcoming turns.

In another embodiment, a method in a flight deck system in an aircraft for providing progressive taxiing guidance to a destination at an aerodrome per taxi clearance information is provided. The method comprises: generating a graphical insert to overlay a small portion (less than a third) of an active navigation display provided on a display device (e.g., heads down display (HDD), heads up display (HUD), electronic flight bag (EFB), tablet computer) in a cockpit of the aircraft, the graphical insert configured to provide a progressive depiction of upcoming travel surfaces (e.g., runways, taxiways, ramp) on a cleared taxi route using stick characters and alphanumeric characters, the graphical insert comprising a non-linear map with non-linear scaling of an area in front of the aircraft, the non-linear map including a first map section that applies a first scaling factor, a second map section that applies a second scaling factor that is smaller than the first scaling factor, a current travel surface alphanumeric indicator, and a current travel surface stick character that is representative of a current travel surface on which the aircraft travels; positioning, on the graphical insert based on an applicable scaling factor, a crossing travel surface sign representing a crossing travel surface that intersects the current travel surface; positioning, on the graphical insert based on an applicable scaling factor, a first-turn travel surface stick character representing a first-turn travel surface that intersects the current travel surface, wherein the first-turn travel surface is the next travel surface after the current travel surface on the cleared taxi route; positioning, on the graphical insert based on an applicable scaling factor, a second-turn travel surface stick character representing a second-turn travel surface that intersects the first-turn travel surface, wherein the second-turn travel surface is the next travel surface after the first-turn travel surface on the cleared taxi route; updating the position of the crossing travel surface sign, the first-turn travel surface stick character, and/or the second-turn travel surface stick character as the aircraft travels on travel surfaces; and causing the graphical insert to be displayed as an overlay over the small portion of the active navigation display provided on the display device while the aircraft travels on travel surfaces.

These aspects and other embodiments may include one or more of the following features. The method may further comprise: receiving the taxi clearance information from air traffic control (e.g., via voice, digital, or manual entry), aircraft sensor inputs identifying a location of the aircraft on a travel surface, and aerodrome mapping data; determining from the taxi clearance information and the aerodrome mapping data the cleared taxi route; determining travel surface current status (e.g., closed runway, closed taxiway) from sources such as the aerodrome mapping data, Digital ATIS or Digital NOTAMS; and identifying a plurality of cleared travel surfaces on the cleared taxi route including the first-turn travel surface and the second-turn travel surface.

The method may further comprise: determining, using the aircraft sensor inputs, the taxi clearance information, and the aerodrome mapping data, when the aircraft deviates from the cleared taxi route; providing an aural and/or visual alert (e.g., advisory, caution, or warning) when the aircraft deviates from the cleared taxi route; determining, using the aircraft sensor inputs, the taxi clearance information, and the aerodrome mapping data, when the aircraft travels onto a surface where the aircraft exceeds a surface limit (e.g., one or more of weight, wingspan and the surface is closed to traffic); providing the aural and/or visual alert when the aircraft travels onto the surface where the aircraft exceeds the surface limit; determining, using the aircraft sensor inputs and the aerodrome mapping data, when the aircraft approaches a location of interest (such as a runway incursion hotspot, a parking stand, or a position reporting location); and providing the visual alert when the aircraft approaches the location of interest.

The graphical insert may comprise a plurality of display modes wherein in a first mode, the graphical insert provides a current travel surface indicator and one or more travel surface signs adjacent to the current travel surface stick character for identifying upcoming turns, wherein each travel surface sign identifies an upcoming travel surface onto which the aircraft may exit the current travel surface. In a second mode (e.g., a navigation mode), the graphical insert may provide the current travel surface alphanumeric indicator, travel surface stick characters for identifying a plurality of turns (e.g., the next two turns) in the cleared taxi route, and the destination for the cleared taxi route. In a third mode (e.g., an alerting mode), the graphical insert may visually display the current travel surface alphanumeric indicator in a manner to indicate travel surface disagreement and, to gain flight crew attention, ceases to display the travel surface stick characters for upcoming turns and/or displays a visual indication that indicates possible travel surface disagreement. In the second mode (e.g., the navigation mode), the graphical insert may provide a predictive alert (e.g., an aural and/or visual alert) of a potential alert condition (e.g., missed turn) that may occur based on aircraft travel characteristics (e.g., aircraft speed) derived from aircraft sensor inputs to allow a flight crew member to take appropriate action to avoid the potential alert condition. In the second mode (e.g., the navigation mode), the graphical insert may provide a predictive alert (e.g., an aural and/or visual alert) of a potential missed turn when the aircraft is determined to not be decelerating ahead of an upcoming turn as per the taxi clearance information to allow a flight crew member to take appropriate action before missing a turn.

In another embodiment, provided is non-transitory computer readable media encoded with programming instructions configurable to cause a processor in a flight deck system in an aircraft to perform a method for providing progressive taxiing guidance to a destination at an aerodrome per taxi clearance information. The method comprises: generating a graphical insert to overlay a small portion (e.g., less than a third) of an active navigation display provided on a display device (e.g., heads down display (HDD), heads up display (HUD), electronic flight bag (EFB), tablet computer) in a cockpit of the aircraft, the graphical insert configured to provide a progressive depiction of upcoming travel surfaces (e.g., runways, taxiways, ramp) on a cleared taxi route using stick characters and alphanumeric characters, the graphical insert comprising a non-linear map with non-linear scaling of an area in front of the aircraft, the non-linear map including a first map section that applies a first scaling factor, a second map section that applies a second scaling factor that is smaller than the first scaling factor, a current travel surface alphanumeric indicator, and a current travel surface stick character that is representative of a current travel surface on which the aircraft travels. The method further comprises positioning, on the graphical insert based on an applicable scaling factor, a crossing travel surface sign representing a crossing travel surface that intersects the current travel surface; positioning, on the graphical insert based on an applicable scaling factor, a first-turn travel surface stick character representing a first-turn travel surface that intersects the current travel surface, wherein the first-turn travel surface is the next travel surface after the current travel surface on the cleared taxi route; positioning, on the graphical insert based on an applicable scaling factor, a second-turn travel surface stick character representing a second-turn travel surface that intersects the first-turn travel surface, wherein the second-turn travel surface is the next travel surface after the first-turn travel surface on the cleared taxi route; updating the position of the crossing travel surface sign, the first-turn travel surface stick character, and/or the second-turn travel surface stick character as the aircraft travels on travel surfaces; and causing the graphical insert to be displayed as an overlay over the small portion of the active navigation display provided on the display device while the aircraft travels on travel surfaces.

In another embodiment, provided is a flight deck system in an aircraft for providing a flight crew with ground path guidance to a destination at an aerodrome (e.g., progressive taxiing instruction per taxi clearance information via a graphical insert on a navigation display HDD that provides a simplified depiction of upcoming taxiways). The flight deck system comprises a controller configured to: receive the taxi clearance information from ATC (via voice, digital, or manual entry), aircraft sensor inputs identifying a location of the aircraft on a taxiway, and aerodrome mapping data; determine from the taxi clearance information and the aerodrome mapping data a cleared taxi route; identify a plurality of cleared taxiways on the cleared taxi route; and generate a graphical display for insertion (e.g., picture in picture insertion) on a navigational display, wherein the graphical display depicts a current taxiway on which the aircraft is traveling and a non-linear scale in a direction of aircraft travel. In an awareness mode, the graphical display provides a current taxiway indicator and a plurality of taxiway signs adjacent to the non-linear scale for identifying upcoming turns (e.g., two taxiway signs for the next two upcoming turns), wherein each taxiway sign identifies an upcoming taxiway onto which the aircraft may exit the current taxiway. In a navigation mode, the graphical display provides the current taxiway indicator, taxiway signs for identifying a plurality of turns (e.g., the next two turns) in the cleared taxi route, and the destination for the cleared taxi route. In an alerting mode, the graphical display provides the current taxiway indicator displayed visually in a manner to indicate taxiway disagreement and, to gain flight crew attention, ceases to display the taxiway signs for an upcoming turn. The controller is further configured to determine, using the aircraft sensor inputs, the taxi clearance information, and the aerodrome mapping data, when the aircraft deviates from the cleared taxi route; provide an aural and/or visual caution alert when the aircraft deviates from the cleared taxi route; determine, using the aircraft sensor inputs, the taxi clearance information, and the aerodrome mapping data, when the aircraft travels onto a surface where the aircraft exceeds a surface limit including one or more of weight, wingspan and the surface is closed to traffic; provide an aural and/or visual caution or warning alert when the aircraft travels onto the surface where the aircraft exceeds the surface limit; determine, using the aircraft sensor inputs and the aerodrome mapping data, when the aircraft approaches a location of interest (such as a runway incursion hotspot, a parking stand, or a position reporting location); and provide an advisory level visual alert when the aircraft approaches the location of interest.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck system in an aircraft for providing progressive taxiing guidance to a destination at an aerodrome per taxi clearance information, the flight deck system comprising a controller configured to:
generate a non-linear map with non-linear scaling of an area in front of the aircraft to overlay a small portion of an active navigation display provided on a display device in a cockpit of the aircraft, the non-linear map configured to provide a progressive depiction of upcoming travel surfaces on a cleared taxi route using stick characters and alphanumeric characters, the non-linear map including:
a first map section that includes the current aircraft position on the non-linear map and applies a first scaling factor,
a second map section that is contiguous with the first map section, does not include the current aircraft position, and applies a second scaling factor that is smaller than the first scaling factor,
a current travel surface alphanumeric indicator, and
a current travel surface stick character that is representative of a current travel surface on which the aircraft travels;
position, on the non-linear map based on the first or second scaling factor, a crossing travel surface sign representing a crossing travel surface that intersects the current travel surface;
position, on the non-linear map based on the first or second scaling factor, a first-turn travel surface stick character representing a first-turn travel surface that intersects the current travel surface, wherein the first-turn travel surface is the next travel surface after the current travel surface on the cleared taxi route;
position, on the non-linear map based on the first or second scaling factor, a second-turn travel surface stick character representing a second-turn travel surface that intersects the first-turn travel surface, wherein the second-turn travel surface is the next travel surface after the first-turn travel surface on the cleared taxi route;
update the position of one or more of the crossing travel surface sign, the first-turn travel surface stick character, and the second-turn travel surface stick character as the aircraft travels on travel surfaces; and
cause the non-linear map to be displayed as an overlay over the small portion of the active navigation display provided on the display device while the aircraft travels on travel surfaces.

2. The flight deck system of claim 1, wherein the controller is further configured to:
receive the taxi clearance information from air traffic control, aircraft sensor inputs identifying a location of the aircraft on a travel surface, and aerodrome mapping data;
determine from the taxi clearance information and the aerodrome mapping data the cleared taxi route; and
identify a plurality of cleared travel surfaces on the cleared taxi route including the first-turn travel surface and the second-turn travel surface.

3. The flight deck system of claim 2, wherein the controller is further configured to:
determine, using the aircraft sensor inputs, the taxi clearance information, and the aerodrome mapping data, when the aircraft deviates from the cleared taxi route; and
provide one or more of an aural or visual alert when the aircraft deviates from the cleared taxi route.

4. The flight deck system of claim 3, wherein the controller is further configured to:
determine, using the aircraft sensor inputs, the taxi clearance information, and the aerodrome mapping data, when the aircraft travels onto a surface where the aircraft exceeds a surface limit; and
provide the one or more of the aural or visual alert when the aircraft travels onto the surface where the aircraft exceeds the surface limit.

5. The flight deck system of claim 4, wherein the controller is further configured to:
determine, using the aircraft sensor inputs and the aerodrome mapping data, when the aircraft enters a closed surface; and
provide the one or more of the aural or visual alert when the aircraft enters the closed surface.

6. The flight deck system of claim 5, wherein the controller is further configured to:

determine, using the aircraft sensor inputs and the aerodrome mapping data, when the aircraft approaches a location of interest; and provide the visual alert when the aircraft approaches the location of interest.

7. The flight deck system of claim 1, wherein to position the crossing travel surface sign, the controller is configured to position, on the non-linear map, the crossing travel surface sign to intersect the current travel surface stick character at the position based on the first or second scaling factor that is proportional to an actual distance of the crossing travel surface to the front of the aircraft, when the crossing travel surface is within the area covered by the non-linear map.

8. The flight deck system of claim 1, wherein to position the first-turn travel surface stick character, the controller is configured to position, on the non-linear map, the first-turn travel surface stick character to intersect the current travel surface stick character at the position based on the first or second scaling factor that is proportional to an actual distance of the first-turn travel surface to the front of the aircraft, when the first-turn travel surface is within the area covered by the non-linear map.

9. The flight deck system of claim 1, wherein to position the second-turn travel surface stick character, the controller is configured to position, on the non-linear map, the second-turn travel surface stick character to intersect the first-turn travel surface stick character at the position based on the first or second scaling factor that is proportional to an actual distance of an intersecting point between the second-turn travel surface and the first-turn travel surface, when the second-turn travel surface is within the area covered by the non-linear map.

10. The flight deck system of claim 1, wherein the non-linear map comprises a plurality of display modes wherein in a first mode, the non-linear map provides a current travel surface indicator and one or more travel surface signs adjacent to the current travel surface stick character for identifying upcoming turns, wherein each travel surface sign identifies an upcoming travel surface onto which the aircraft may exit the current travel surface.

11. The flight deck system of claim 10, wherein in a second mode, the non-linear map provides the current travel surface alphanumeric indicator, travel surface stick characters for identifying a plurality of turns in the cleared taxi route, and the destination for the cleared taxi route.

12. The flight deck system of claim 11, wherein, in the second mode, the controller provides a predictive alert of a potential alert condition that may occur based on aircraft travel characteristics derived from aircraft sensor inputs to allow a flight crew member to take appropriate action to avoid the potential alert condition.

13. The flight deck system of claim 11, wherein, in the second mode, the controller provides a predictive alert of a potential missed turn when the aircraft is determined to not be decelerating ahead of an upcoming turn as per the taxi clearance information to allow a flight crew member to take appropriate action before missing a turn.

14. The flight deck system of claim 11, wherein in a third mode, the non-linear map visually displays the current travel surface alphanumeric indicator in a manner to indicate travel surface disagreement and, to gain flight crew attention, ceases to display the travel surface stick characters for upcoming turns.

15. A method in a flight deck system in an aircraft for providing progressive taxiing guidance to a destination at an aerodrome per taxi clearance information, the method comprising:

generating a non-linear map to overlay a small portion of an active navigation display provided on a display device in a cockpit of the aircraft, the non-linear map configured to provide a progressive depiction of upcoming travel surfaces on a cleared taxi route using stick characters and alphanumeric characters, the non-linear map providing non-linear scaling of an area in front of the aircraft, the non-linear map including a first map section that includes the current aircraft position on the non-linear map and applies a first scaling factor, a second map section that is contiguous with the first map section, does not include the current aircraft position, and applies a second scaling factor that is smaller than the first scaling factor, a current travel surface alphanumeric indicator, and a current travel surface stick character that is representative of a current travel surface on which the aircraft travels;

positioning, on the non-linear map based on the first or second scaling factor, a crossing travel surface sign representing a crossing travel surface that intersects the current travel surface;

positioning, on the non-linear map based on the first or second scaling factor, a first-turn travel surface stick character representing a first-turn travel surface that intersects the current travel surface, wherein the first-turn travel surface is the next travel surface after the current travel surface on the cleared taxi route;

positioning, on the non-linear map based on the first or second scaling factor, a second-turn travel surface stick character representing a second-turn travel surface that intersects the first-turn travel surface, wherein the second-turn travel surface is the next travel surface after the first-turn travel surface on the cleared taxi route;

updating one or more of the position of the crossing travel surface sign, the first-turn travel surface stick character, and the second-turn travel surface stick character as the aircraft travels on travel surfaces; and causing the non-linear map to be displayed as an overlay over the small portion of the active navigation display provided on the display device while the aircraft travels on travel surfaces.

16. The method of claim 15, further comprising:
receiving the taxi clearance information from air traffic control, aircraft sensor inputs identifying a location of the aircraft on a travel surface, and aerodrome mapping data;

determining from the taxi clearance information and the aerodrome mapping data the cleared taxi route; and identifying a plurality of cleared travel surfaces on the cleared taxi route including the first-turn travel surface and the second-turn travel surface.

17. The method of claim 16, further comprising:
determining, using the aircraft sensor inputs, the taxi clearance information, and the aerodrome mapping data, when the aircraft deviates from the cleared taxi route;

providing one or more of an aural or visual alert when the aircraft deviates from the cleared taxi route;

determining, using the aircraft sensor inputs, the taxi clearance information, and the aerodrome mapping data, when the aircraft travels onto a surface where the aircraft exceeds a surface limit;

providing the one or more of the aural or visual alert when the aircraft travels onto the surface where the aircraft exceeds the surface limit;

determining, using the aircraft sensor inputs and the aerodrome mapping data, when the aircraft approaches a location of interest; and providing the visual alert when the aircraft approaches the location of interest.

18. The method of claim 15, wherein the non-linear map comprises a plurality of display modes wherein:

in a first mode, the non-linear map provides a current travel surface indicator and one or more travel surface signs adjacent to the current travel surface stick character for identifying upcoming turns, wherein each travel surface sign identifies an upcoming travel surface onto which the aircraft may exit the current travel surface;

in a second mode, the non-linear map provides the current travel surface alphanumeric indicator, travel surface stick characters for identifying a plurality of turns in the cleared taxi route, and the destination for the cleared taxi route; and in a third mode, the non-linear map visually displays the current travel surface alphanumeric indicator in a manner to indicate travel surface disagreement and, to gain flight crew attention, ceases to display the travel surface stick characters for upcoming turns and/or displays a visual indication that indicates possible travel surface disagreement.

19. The method of claim 18, wherein, in the second mode, the non-linear map provides:

a predictive alert of a potential alert condition that may occur based on aircraft travel characteristics derived from aircraft sensor inputs to allow a flight crew member to take appropriate action to avoid the potential alert condition; and a predictive alert of a potential missed turn when the aircraft is determined to not be decelerating ahead of an upcoming turn as per the taxi clearance information to allow a flight crew member to take appropriate action before missing a turn.

20. Non-transitory computer readable media encoded with programming instructions configurable to cause a processor in a flight deck system in an aircraft to perform a method for providing progressive taxiing guidance to a destination at an aerodrome per taxi clearance information, the method comprising:

generating a non-linear map to overlay a small portion of an active navigation display provided on a display device in a cockpit of the aircraft, the non-linear map configured to provide a progressive depiction of upcoming travel surfaces on a cleared taxi route using stick characters and alphanumeric characters, the non-linear map providing non-linear scaling of an area in front of the aircraft, the non-linear map including a first map section that includes the current aircraft position on the non-linear map and applies a first scaling factor, a second map section that is contiguous with the first map section, does not include the current aircraft position, and applies a second scaling factor that is smaller than the first scaling factor, a current travel surface alphanumeric indicator, and a current travel surface stick character that is representative of a current travel surface on which the aircraft travels;

positioning, on the non-linear map based on the first or second scaling factor, a crossing travel surface sign representing a crossing travel surface that intersects the current travel surface;

positioning, on the non-linear map based on the first or second scaling factor, a first-turn travel surface stick character representing a first-turn travel surface that intersects the current travel surface, wherein the first-turn travel surface is the next travel surface after the current travel surface on the cleared taxi route;

positioning, on the non-linear map based on the first or second scaling factor, a second-turn travel surface stick character representing a second-turn travel surface that intersects the first-turn travel surface, wherein the second-turn travel surface is the next travel surface after the first-turn travel surface on the cleared taxi route;

updating one or more of the position of the crossing travel surface sign, the first-turn travel surface stick character, and the second-turn travel surface stick character as the aircraft travels on travel surfaces; and causing the non-linear map to be displayed as an overlay over the small portion of the active navigation display provided on the display device while the aircraft travels on travel surfaces.

\* \* \* \* \*